May 19, 1931. G. JOHNSON 1,805,871
MOLD FOR TOILET SEATS
Filed Nov. 19, 1928  2 Sheets-Sheet 1
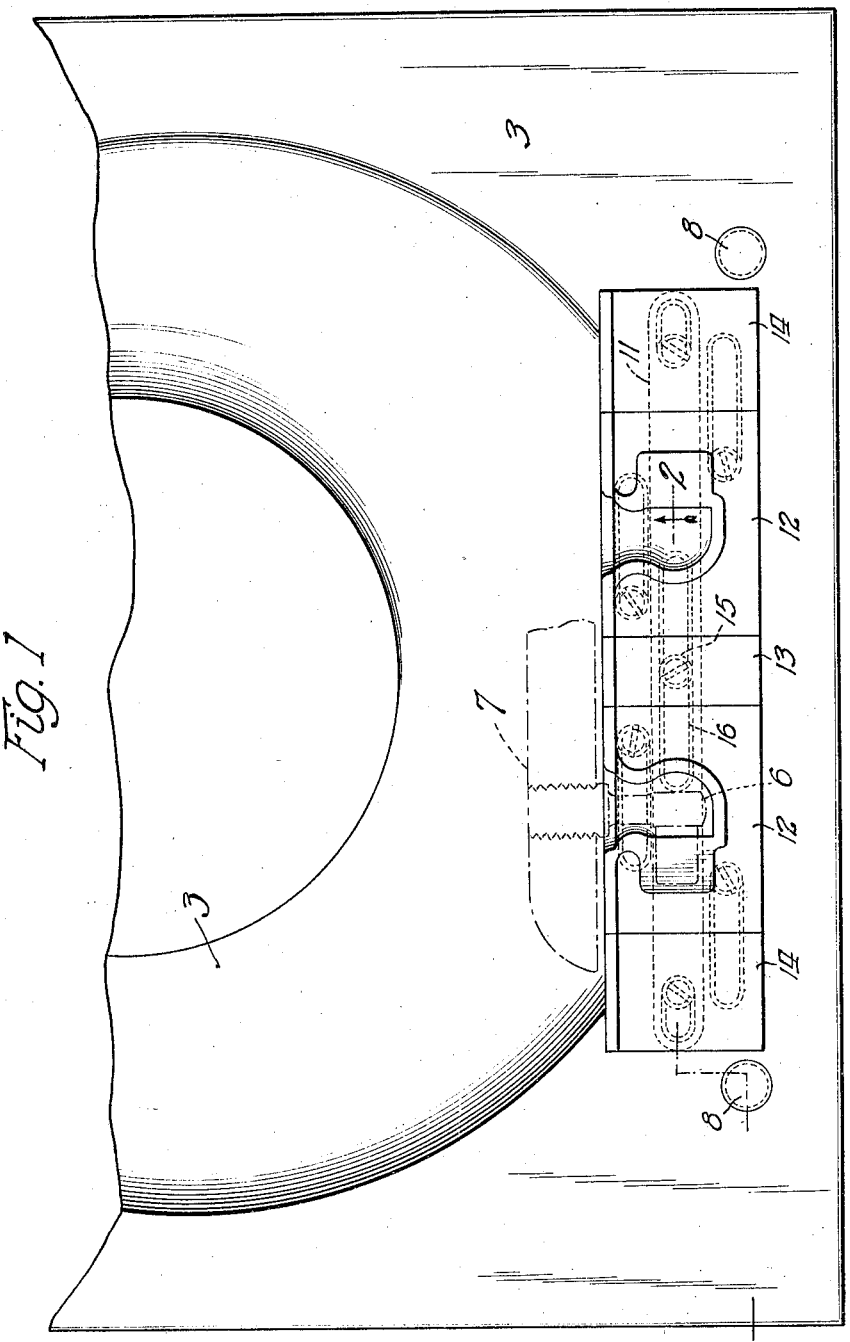
Inventor
George Johnson
By: James P. Shea Atty

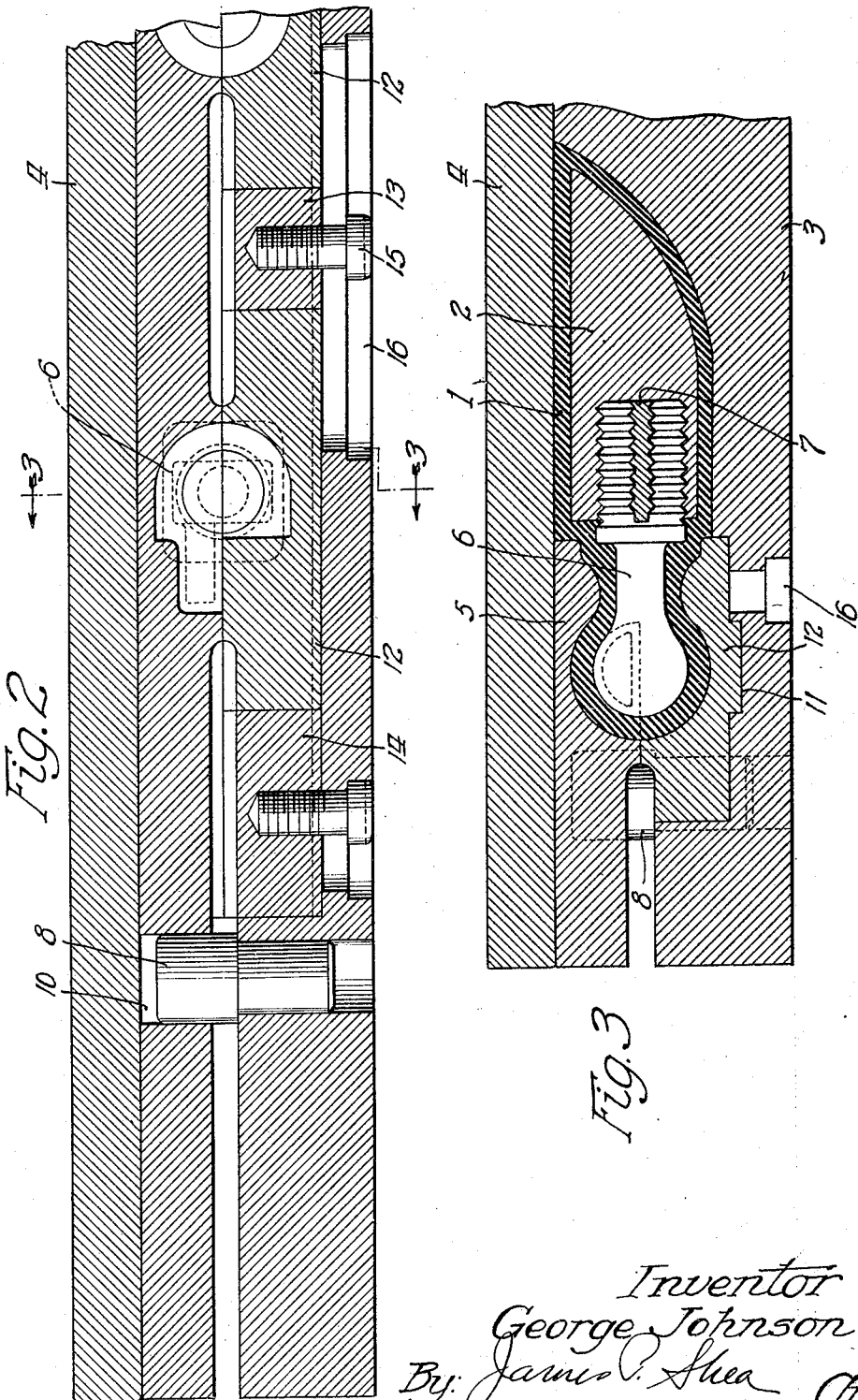

Patented May 19, 1931

1,805,871

UNITED STATES PATENT OFFICE

GEORGE JOHNSON, OF MUSKEGON, MICHIGAN, ASSIGNOR TO THE BRUNSWICK-BALKE-COLLENDER COMPANY, OF CHICAGO, ILLINOIS, A CORPORATION OF DELAWARE

MOLD FOR TOILET SEATS

Application filed November 19, 1928. Serial No. 320,419.

My invention relates to molds, and has an especial relation to molds for forming toilet seats.

One object of my invention is to provide toilet seat molds which are adjustable to correspond to the varying distances at which the hinge lugs of the seat which is being molded are spaced apart.

Another object of my invention is to provide molds of the character described which are of an especially simple construction.

Other objects and advantages will appear as the description proceeds.

Referring to the accompanying drawings:

Fig. 1 is a plan view of molds for shaping the plastic material on one side of a toilet seat;

Fig. 2 is a sectional view through the molds assembled about both sides of a toilet seat and hinge lugs, the view being taken on the plane indicated by the line 2—2 of Fig. 1; and Fig. 3 is a sectional view on the line 3—3 of Fig. 2.

The molds are illustrated as forming a plastic coating 1 about the wooden core 2 of a toilet seat, but it will be understood that the wooden core 2 may be omitted and plastic material or any other kind of core may be used instead.

At the time of completion of the molding operation, a relatively large mold 3 defines the upper surface of the plastic coating 1 of the toilet seat and a large mold 4 defines the bottom surface thereof. A single small mold 5 defines a side of hinge lugs 6 which extend into the core 2 and are rigid with an insert 7 embedded therein. The mold 5 is interposed between the large molds 3 and 4 and located in position by means of pins 8 on the mold 3 which extend upwardly through openings 10 in the mold 5. The mold 3 also has a recess 11 therein in which a pair of small molds 12 for the other sides of the hinge lugs are fitted.

The small molds 12 are spaced apart by a spacer block 13 and additional spacer blocks 14 are fitted in the recess for preventing endwise movement of the small molds 12. Each of the small molds 12 and the spacer blocks 13 and 14 is provided with a bolt 15 which extends through a corresponding slot 16 in the large mold 3, for securing the part in adjusted position.

In the use of the molds, the small molds 12 are first assembled with respect to the large mold 3 and are moved to a desired position corresponding to the space between the hinge lugs. Spacer blocks of such size as to correspond to the unfilled spaces in the recess 11 are then fitted in place and the bolts 15 are tightened to secure the parts rigidly in position.

The seat, including a soft coating of plastic material over the core and hinge lugs, is then placed in the large mold, the hinge lugs 6 extending into the small molds 12. The mold 5 is then lowered over the pins 8 and the large mold 4 is brought into compressive relation with the other parts and pressure is applied to the large molds, forcing them into the relative position shown in the drawings. If a hard rubber composition is used as the coating it is vulcanized in the molds. Thus a hard, smooth coating of plastic is formed on the core and the hinge lugs.

There is a wide variation in the distances at which the lugs of toilet seats are spaced apart and heretofore it has been necessary in forming the plastic material to provide a large number of different molds to correspond to the different spacings of the hinge lugs. With my invention it is unnecessary to have this large number of molds, as the variation in the spacing between the hinge lugs is provided for by the adjustability of the small molds 12 which may be quickly and conveniently adjusted in position, as is apparent.

My invention is not limited to the specific details of the constructions illustrated and described, but a substantial range of equivalents is contemplated within the spirit of the invention and the scope of the appended claims.

What I desire to secure by Letters Patent is:—

1. In a device for molding a coating of plastic composition about a toilet seat core having projecting hinge lugs, the combination of a large mold for one side of the core, a pair of small molds for one side of the hinge lugs, adjustably secured to said large mold so that their position may be changed to correspond to the distance between the said lugs, a large mold for the other side of said core, and a single small mold for the other side of both of said lugs.

2. In a device for molding a coating of plastic composition about a toilet seat core having projecting hinge lugs, the combination of a large mold for one side of the core, having a recess therein, a pair of small molds for one side of the hinge lugs, fitting in said recess and being spaced apart, a spacer block in said recess between said small molds, and a pair of spacer blocks, each fitting in said recess and disposed outwardly with respect to said small molds to define the position thereof, all of said spacer blocks being removable to permit adjustment of the position of said small molds to correspond to the position of the hinge lugs; and complementary molding means for the other side of said core and said hinge lugs.

3. In a device for molding a coating of plastic composition about a toilet seat core having projecting hinge lugs, the combination of a large mold for one side of the core, having a recess therein, a pair of small molds for one side of the hinge lugs, fitting in said recess, each of said small molds being adjustably secured in said recess by a bolt extending through a slot in said mold whereby said small molds may be adjusted in position to correspond to the position of said hinge lugs; and complementary molding means for the other side of said core and said lugs.

In witness whereof I hereunto subscribe my name.

GEORGE JOHNSON.